United States Patent
Yang et al.

(10) Patent No.: US 9,233,393 B2
(45) Date of Patent: Jan. 12, 2016

(54) PROCESS FOR CREATING LITHOGRAPHICALLY-DEFINED PLASMONIC STRUCTURES WITH ENHANCED Q FACTORS

(71) Applicant: Agency for Science, Technology and Research, Singapore (SG)

(72) Inventors: Joel K. W. Yang, Singapore (SG); Michel Bosman, Singapore (SG); Huigao Duan, Singapore (SG); Karthik Kumar, Singapore (SG); In Yee Phang, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 298 days.

(21) Appl. No.: 13/847,193

(22) Filed: Mar. 19, 2013

(65) Prior Publication Data
US 2013/0243947 A1  Sep. 19, 2013

(30) Foreign Application Priority Data
Mar. 19, 2012  (SG) .............................. 201201971-7

(51) Int. Cl.
| | | |
|---|---|---|
| B05D 1/32 | (2006.01) | |
| B65B 33/00 | (2006.01) | |
| B05D 3/00 | (2006.01) | |
| B82Y 30/00 | (2011.01) | |

(52) U.S. Cl.
CPC ................. *B05D 3/007* (2013.01); *B82Y 30/00* (2013.01)

(58) Field of Classification Search
CPC ........ B82Y 30/00; B82Y 40/00; C23C 14/10; C23C 14/0611; C23C 14/5806
See application file for complete search history.

(56) References Cited

U.S. PATENT DOCUMENTS

| | | | |
|---|---|---|---|
| 4,657,583 A * | 4/1987 | Crane et al. ..................... | 75/348 |
| 2006/0099462 A1* | 5/2006 | Ahner et al. ................... | 428/836 |
| 2008/0166506 A1* | 7/2008 | Shin et al. ....................... | 428/29 |

OTHER PUBLICATIONS

Sancho-Parramon et al; Modification of optical properties of metal island films by electric field assisted dissolution of clusters; Advances in Optical Thin Films III, Proc. of SPIE vol. 7101.71011X; 2008.*

* cited by examiner

*Primary Examiner* — Michael Wieczorek
(74) *Attorney, Agent, or Firm* — Schwegman Lundberg & Woessner, P.A.

(57) ABSTRACT

A method for plasmonic structure manufacture and for protecting a plasmonic nanostructure during annealing is provided. The method includes: lithographically forming a plasmonic nanostructure on a substrate; encapsulating the plasmonic nanostructure in high temperature resistant material; annealing the plasmonic nanostructure; and removing the high temperature resistant material to reveal the annealed plasmonic nanostructure.

12 Claims, 4 Drawing Sheets

PROCESS FOR CREATING LITHOGRAPHICALLY-DEFINED PLASMONIC STRUCTURES WITH ENHANCED Q FACTORS

INCORPORATION BY CROSS REFERENCE

This application claims priority from Singapore Application No. SG 201201971-7 filed on 19 Mar. 2012 the entire contents of which are incorporated herein by cross-reference in their entirety.

TECHNICAL FIELD

The present invention generally relates to plasmonic structures, and more particularly relates to a process for creating lithographically-defined plasmonic structures with enhanced Q factors.

BACKGROUND

Free electrons in metal nanostructures can be driven by light to oscillate collectively. This occurs at optical frequencies and results in so-called plasmon resonances. Plasmon resonances in these nanostructures are useful in applications where light needs to be coupled into or out of nanoscale materials. For example, plasmon resonances are used in sensing trace amounts of chemicals, heat assisted magnetic recording and solar cells. In these applications, the strength of the plasmon resonances is important. In other words, longer oscillation of electrons, i.e. a higher Q factor, is preferred. Accordingly, reduced damping in the electron oscillations is preferred to obtain such improved performances.

Plasmon resonances are strongly dependent on the size and shape of the nanostructures. Accordingly, lithographic methods that provide excellent size and shape control are preferred. However, these methods, when combined with metal deposition techniques such as electron-beam and thermal evaporation, result in polycrystalline nanostructures. The presence of grain boundaries in these polycrystalline nanostructures results in increased damping of the electron oscillations when compared with monocrystalline nanostructures and, therefore, leads to weaker resonances, i.e. a lower Q factor.

Smooth nanostructured surfaces are also desired to reduce further damping effects by surface scattering of electrons. Accordingly, deposition techniques that result in small grain size, e.g., deposition at low temperatures and/or high rate, are preferred. However, the smaller grain size in turn causes increased damping due to grain boundary scattering.

Annealing by thermal treatment is commonly used to improve crystallinity, such as promote crystal growth and minimize grain boundary defects in materials, and, thereby, increase Q factor. However, when applied to nanostructures on substrate, annealing also induces an undesired reshaping of the geometry, such as via dewetting of metals to form clumps. This reshaping is especially problematic in linear high-aspect structures such as the commonly-used nanorod antennas, as structural Raleigh instability results in segmentation of the nanostructure into randomly-sized particles.

Thus, what is needed is a process which preserves the original shape of the nanostructures while allowing grain boundary migration within the nanostructures. Furthermore, other desirable features and characteristics will become apparent from the subsequent detailed description and the appended claims, taken in conjunction with the accompanying drawings and this background of the disclosure.

SUMMARY

A method for protecting a plasmonic nanostructure during annealing is provided. The method includes encapsulating the plasmonic nanostructure in a high temperature resistant material during annealing.

A method for plasmonic structure manufacture is also provided. The method includes lithographically forming a plasmonic nanostructure on a substrate. The method includes encapsulating the plasmonic nanostructure in high temperature resistant material. The method further includes annealing the plasmonic nanostructure. The method also includes removing the high temperature resistant material to reveal the annealed plasmonic nanostructure.

DETAILED DESCRIPTION

Various embodiments relate to a method for protecting a plasmonic nanostructure during annealing and a method for plasmonic structure manufacture.

Figure 1:
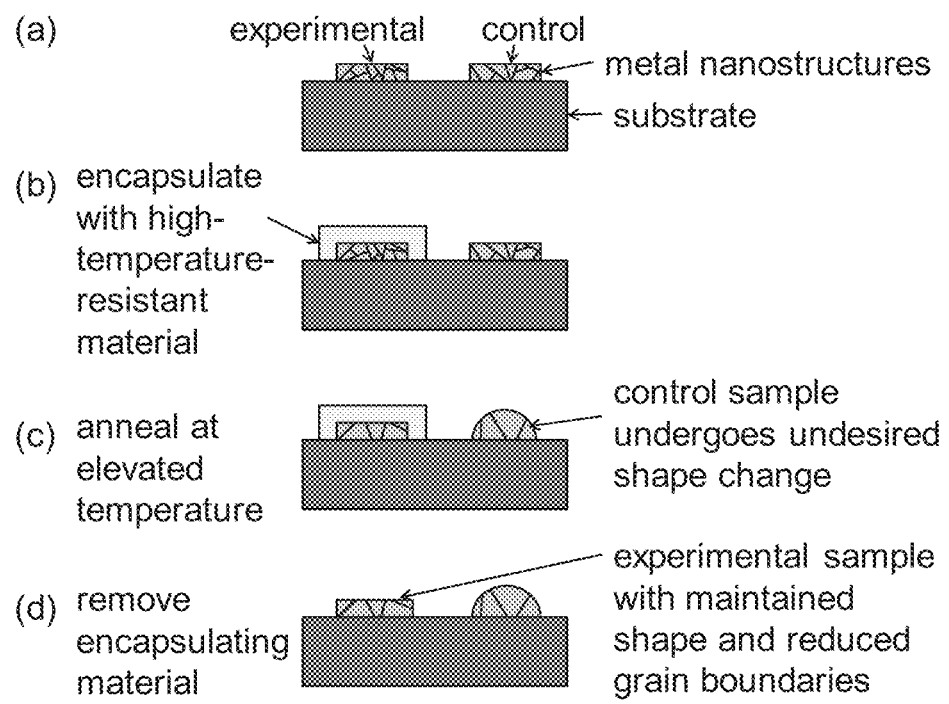
FIG. 1 is a diagram of a process flow in accordance with an embodiment.

Referring to FIG. 1, there is shown a diagram of a process flow for annealing encapsulated and unencapsulated plasmonic nanostructures. Referring to FIG. 1(a), there is shown two plasmonic nanostructures: on the left, an experimental sample for encapsulation and, on the right, one control sample for comparison. The plasmonic nanostructures may comprise a periodic structure fabricated from metal nanostructures that support plasmon resonances. The plasmonic nanostructure may be fabricated from metal materials, such as gold (Au), silver (Ag), aluminum (Al), copper (Cu), and chromium (Cr). The nanostructures may be fabricated using lithographic methods, such as electron-beam lithography, nanoimprint lithography, and photolithography, and combined with metallization methods, such as physical vapor deposition, e.g. thermal, electron beam physical vapor deposition and evaporation deposition onto solid substrates such as silicon nitride, silicon, or quartz.

Referring to FIG. 1(b), the experimental plasmonic nanostructure is encapsulated with high temperature resistant materials. The high temperature resistant material encapsulant may comprise a material that is stable at high temperatures, for example, a temperature range above 400° C. and up to 2000° C. It is to be understood that the stability of the high temperature resistant materials may include the property of not decomposing at the high temperatures. The high temperature resistant material encapsulant may comprise hydrogen silsesquioxane (HSQ), SiO2, carbon or diamond like carbon, glass or the like. Also, the high temperature resistant material encapsulant are easily applied and removed without affecting the plasmonic nanostructures. On the other hand, the control plasmonic nanostructure is not unencapsulated for comparison.

Referring to FIG. 1(c), the plasmonic nanostructures are subjected to an annealing process. The annealing process is often used to improve crystallinity of the nanostructure, for example, to induce grain-boundary motion and recrystallization of the material. Accordingly, the grain size may be increased during annealing and the number of the grain boundaries may be decreased. Also, the grain boundary defects may be minimized. Therefore, the Q factor of the annealed plasmonic structure may be increased. Higher Q factors mean that energy of the plasmon in a form of charge oscillation may last longer during a plasmon resonance due to reduced losses in the structure itself. In other words, higher Q factors provide a more efficient plasmon resonance system where the energy can be readily delivered to other nearby material instead of being absorbed by the plasmonic structure itself. Some improvements resulting from higher Q factors include: higher field enhancement, which translates to higher sensitivity for plasmonic sensors, brighter emitters when coupled to dye molecules, quantum dots, LEDs, and higher absorptance when coupled to solar cells. In general, a higher Q factor indicates that light-reactive plasmonic resonance of the nanoscale material is increased.

The annealing process is done at a sufficiently high temperature to improve crystallinity. During annealing, the encapsulation acts as a shape-preserving mold for the nanostructures thus preventing shape change of the nanostructures while allowing the grain boundaries within the nanostructure to be annealed out. On the other hand, because of the grain-boundary motion and recrystallization during annealing, the unencapsulated control nanostructure may undergo undesired shape change. Accordingly, the undesirably shape changed plasmonic structure may not work as intended.

Referring to FIG. 1(d), after annealing, the encapsulation is removed. The shape of the experimental plasmonic structure maintains whereas the shape of the control plasmonic nanostructure changes undesirably. Accordingly, this undesirable change of the control plasmonic nanostructure may influence its plasmonic resonances or field distributions. On the other hand, Q factor of the experimental plasmonic nanostructure may be improved with reduced grain boundaries and maintained shape.

This shape-maintaining annealing (SMA) method may be also used in promoting recrystallization of nanostructures of other materials without significant shape change, e.g. semiconductors, and metals other than gold.

AN EXAMPLE

Figure 2:
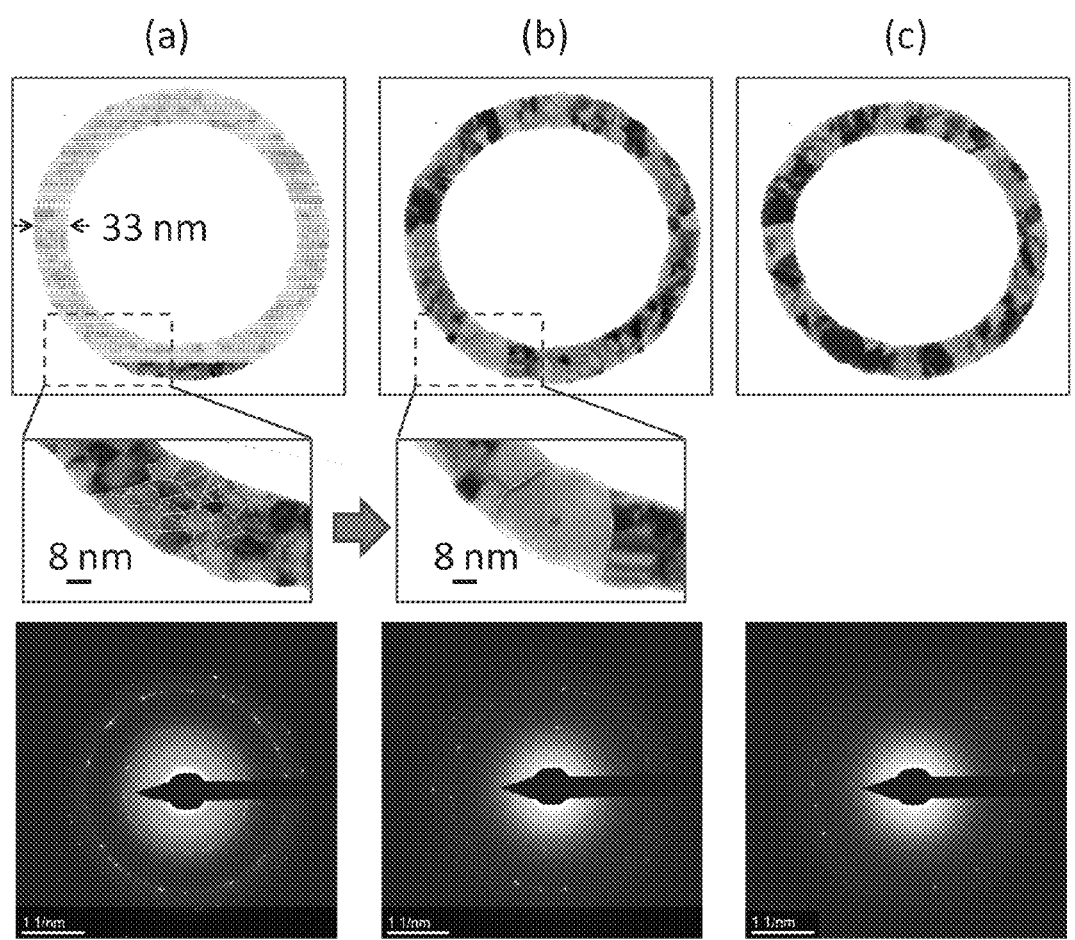
FIG. 2 are Transmission Electron Microscope (TEM) images and Electron diffraction patterns of a plasmonic structure (a) before anneal, (b) anneal for 6 minutes and (c) anneal for 20 minutes in accordance with an embodiment.

A non-limiting example of the invention will be further described in greater detail by reference to the specific example, which should not be construed as in any way limiting the scope of the invention. Referring to FIG. 2, there are shown TEM images and Electron diffraction patterns in an exemplary example in accordance with the present embodiment. It can be seen from the TEM images that the grain size increases after annealing and that the number of the grain boundaries decreases. Accordingly, the resulted improved crystallinity provides a higher Q factor of the plasmonic nanostructure after annealing than that of the plasmonic nanostructure before annealing.

Gold (Au) plasmonic nanostructures were fabricated on a 30 nanometer-thick silicon-nitride (SiN) membrane using a process as described below. Firstly, polymethyl methacrylate (PMMA) resist was spincoated onto SiN membrane TEM windows from Agar Scientific Ltd. (Essex, UK) to a thickness of about 65 nanometers. The sample was then exposed in an Elionix ELS-7000 electron-beam lithography (EBL) system at 100 kilovolts acceleration voltage to define the geometries of the nanostructures. The sample was then developed at 0° C. temperature in 3:1 isopropyl alcohol: methyl isobutyl ketone for 15 seconds to remove the exposed resist. In one embodiment, a one nm Chromium (Cr) adhesion layer followed by 17 nm Au was deposited onto the sample in a thermal evaporator while the sample was cooled to $-180°$ C. In another embodiment, only 17 nm Au was deposited onto the sample in a thermal evaporator once the sample was cooled to $-180°$ C. Finally, liftoff was done on both samples to remove metal-coated resist by immersing the sample in a hot N-methylpyrrolidone (NMP) solvent at 60° C. leaving behind the patterned nanostructures.

To encapsulate the Au plasmonic nanostructures, HSQ was spun thereon at 4 kilo-revolutions per minute. HSQ was then irradiated by EBL to crosslink it therefore forming a robust silicon oxide that is resistant to high-temperature treatment. Annealing was done in a rapid thermal processor at 350° C. The sample was removed for imaging in a TEM after the first 6 minutes and again after a total of 20 minutes. Care was taken to image the exact same nanostructure each time.

To measure the plasmonic resonances, a FEI Titan TEM was used with monochromated electron energy-loss spectroscopy (EELS). FIG. 2 shows an example of a single ring structure imaged in the TEM at various steps of the process. In FIG. 2(a), the small grains within the structure with an average grain size of about 8 nanometers can be seen. Upon encapsulation and annealing at 350° C. for 6 minutes, the grain size was seen to become larger, with an average size of about 20 nanometers. Further annealing resulted only in a slight increase in the grain size, as seen in FIG. 2(c).

Figure 3:
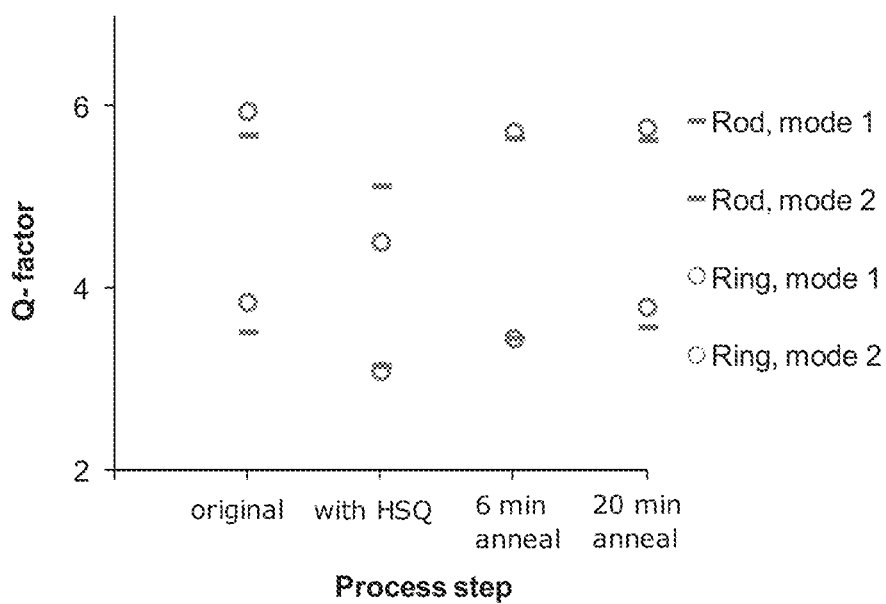
FIG. 3 is a plot showing Q factors of plasmonic structures in accordance with FIG. 2.

The EELS measurements produced spectra with clear resonance peaks for different resonant modes. The Q factors of the ring structure shown in FIG. 2, and a 440-nanometer long rod was measured at every step of the process for these different modes, as shown in FIG. 3. Upon encapsulation, a decrease in Q factor by ~20% was observed. This decrease in Q factor or increase in damping could be due to the increase in radiative losses due to index-matching of the structures to free space. The positive effect on annealing can be observed in the increase in the Q factor also by ~20%. Upon removal of the encapsulation, the Q factor is expected to be 20% higher than that of the original structure. The encapsulating silicon oxide can be removed by dipping the sample into a dilute solution of hydrofluoric acid.

Figure 4:
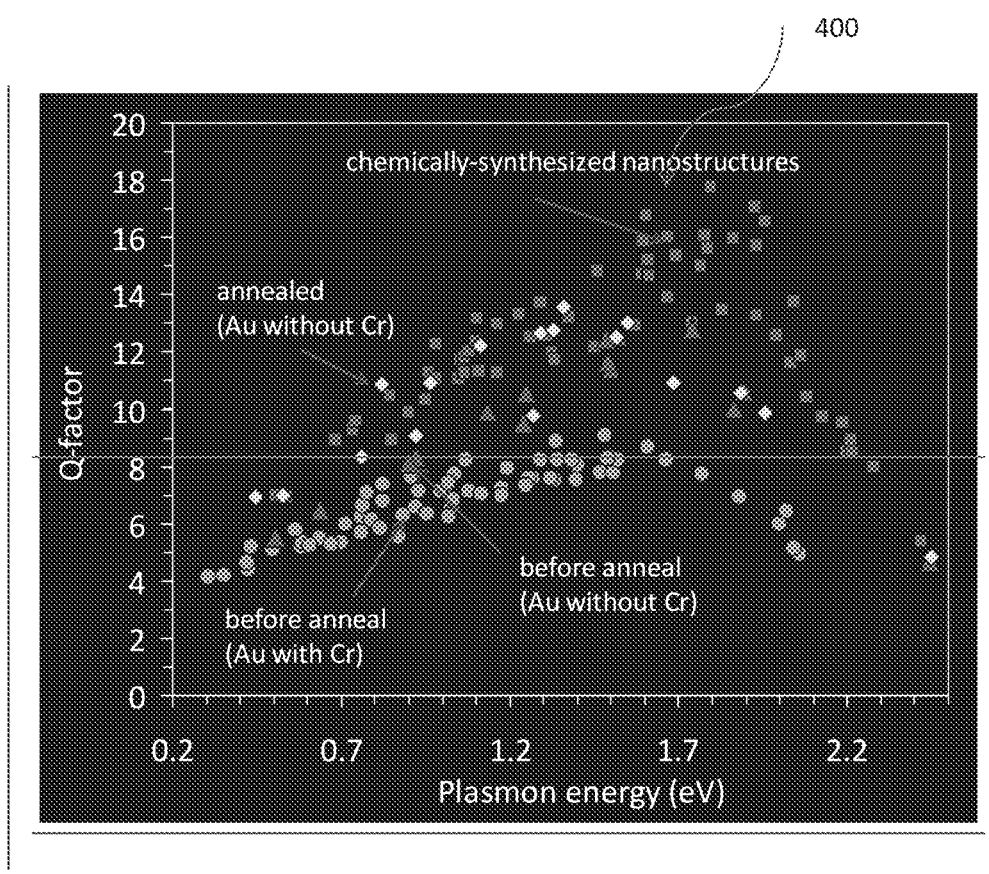
FIG. 4 is a plot showing Q factors of plasmonic structures in accordance with steps of the process flow of FIG. 1.

FIG. 4 shows a plot 400 of Q factors for various samples as described below. The circles correspond to samples fabricated with Au nanostructures on a Cr adhesion layer before any annealing step. The triangles correspond to samples fabricated with Au nanostructures but without a Cr adhesion layer before any annealing step. The diamonds correspond to samples without Cr adhesion after an annealing step and removal of the encapsulation in accordance with the present embodiment. The squares correspond to conventional chemically-synthesized nanostructures.

It can be seen from the plot 400 that before annealing Q factors of the samples fabricated without the Cr adhesion layer increase by ~30% as compared to those of the samples fabricated with Cr adhesion layer. The samples fabricated without the Cr adhesion layer were then encapsulated, annealed, and dipped in hydrofluoric acid to remove the encapsulation in accordance with the present embodiment. The effect of these combined processes in accordance with the present embodiment resulted in an increase in the Q factor by up to ~35%. Hence, the total improvement in Q factor by avoiding the use of Cr, annealing, and removing the encapsulation is ~80% over the original structures that consisted of Au on Cr.

It can also been seen from the plot 400 that the Q factors obtained in accordance with the present embodiment are comparable to Q factors of the conventional chemically-synthesized nanostructures which are crystalline in nature, i.e. without grain boundaries. Hence, using the process of the present embodiment, one is able to make nanostructures using electron-beam lithography with Q factors comparable to conventional chemically-synthesized nanostructures, but with the added advantage of being able to control the exact geometry and size of the nanostructures.

Another advantage of various embodiments is to provide encapsulating plasmonic nanostructures, wherein the encapsulated nanostructures are more resistive to high-temperature processes, such as annealing, Thereby retaining the size and geometry resulting in an enhanced Q factor of the annealed encapsulated nanostructures.

Thus it can be seen that encapsulated plasmonic nanostructures have been provided which eliminates the problems associated with the annealing process. Such shape-maintaining annealing method in accordance with the various embodiments disclosed can provide plasmonic nanostructures with enhanced Q factors, which are more desirable in the applications of the plasmonic nanostructures. While several exemplary embodiments have been presented in the foregoing detailed description of the invention, it should be appreciated that a vast number of variations exist, including variations as to the material used for the nanostructure and encapsulation and the temperature used for the annealing process.

It should further be appreciated that the exemplary embodiments are only examples, and are not intended to limit the scope, applicability, dimensions, or configuration of the invention in any way. Rather, the foregoing detailed description will provide those skilled in the art with a convenient road map for implementing exemplary embodiments of the invention, it being understood that various changes may be made in the function and arrangement of elements and method of implementation described in an exemplary embodiment without departing from the scope of the invention as set forth in the appended claims.

The invention claimed is:

1. A method for plasmonic structure manufacture comprising:
   lithographically forming a plasmonic nanostructure on a substrate;
   encapsulating the plasmonic nanostructure in high temperature resistant material;
   annealing the plasmonic nanostructure; and
   removing the high temperature resistant material to reveal the annealed plasmonic nanostructure,
   wherein the lithographically forming comprises lithographically forming the plasmonic nanostructure using a lithographic method selected from the group consisting of electron-beam lithography, nanoimprint lithography and photolithography, combined with a metallization method selected from the group consisting of electron beam physical vapor deposition and evaporation deposition.

2. The method of claim 1, wherein the high temperature resistant material comprises materials that are stable with a temperature range of 400° C. to 2000° C.

3. The method of claim 1, wherein the high temperature resistant material comprises a high temperature resistant material selected from the group consisting of hydrogen silsesquioxane (HSQ), $SiO_2$, carbon, diamond like carbon and glass.

4. The method of claim 1, wherein the high temperature resistant material comprises a material that is removable without affecting the plasmonic nanostructure.

5. The method of claim 1, wherein the plasmonic nanostructure is formed from a metal material.

6. The method of claim 5, wherein the metal material comprises a material selected from the group consisting of Au, Ag, Al, Cu and Cr.

7. The method of claim 1, wherein the step of encapsulating comprises encapsulating the plasmonic nanostructure having a first Q factor in high temperature resistant material, wherein the step of annealing comprises annealing the plasmonic nanostructure to form a plasmonic nanostructure having a second Q factor, wherein the second Q factor is greater than the first Q factor.

8. The method of claim 1, wherein the step of lithographically forming a plasmonic nanostructure comprises lithographically forming the plasmonic nanostructure directly on the substrate without an adhesion layer therebetween.

9. The method of claim 1, wherein the step of lithographically forming a plasmonic nanostructure comprises lithographically forming the plasmonic nanostructure directly on the substrate without a Cr layer therebetween.

10. The method of claim 1, wherein the step of annealing the plasmonic nanostructure comprises annealing at a high temperature sufficient to induce grain boundary motion and recrystallization in the plasmonic nanostructure.

11. The method of claim 1, wherein the step of encapsulating the plasmonic nanostructure in a high temperature resistant material prior to annealing enhances Q factor of the plasmonic nanostructure.

12. The method of claim 11, wherein the step of encapsulating the plasmonic nanostructure comprises encapsulating the plasmonic nanostructure having a first Q factor in high temperature resistant material, wherein the step of annealing comprises annealing the plasmonic nanostructure to form a plasmonic nanostructure having a second Q factor, wherein the second Q factor is greater than the first Q factor.

* * * * *